United States Patent [19]
Sakuma et al.

[11] Patent Number: 5,909,071
[45] Date of Patent: Jun. 1, 1999

[54] SWITCHED RELUCTANCE MOTOR

[75] Inventors: Masafumi Sakuma, Chriyu; Akemi Ookawa, Chita-gun, both of Japan

[73] Assignee: Aisin Seiki Kabushiki Kaisha, Kariya, Japan

[21] Appl. No.: 08/845,411

[22] Filed: Apr. 25, 1997

[30] Foreign Application Priority Data

Apr. 25, 1996 [JP] Japan .................................. 8-105819

[51] Int. Cl.$^6$ .......................... H02K 1/24; H02K 19/00
[52] U.S. Cl. ........................ 310/51; 310/261; 310/269; 310/166
[58] Field of Search ............................. 310/51, 269, 261, 310/166, 168

[56] References Cited

FOREIGN PATENT DOCUMENTS

| 1026843 | 3/1958 | Germany | H02K 55/01 |
|---|---|---|---|
| 4036565 | 5/1992 | Germany | H02P 8/00 |
| 522914 | 1/1993 | Japan | H02K 19/06 |
| 2231214 | 11/1990 | United Kingdom | H02P 6/02 |
| 95/29529 | 11/1995 | WIPO | H02K 1/20 |

*Primary Examiner*—Nestor Ramirez
*Assistant Examiner*—B. Mullins
*Attorney, Agent, or Firm*—Sughrue, Mion, Zinn, Macpeak & Seas, PLLC

[57] ABSTRACT

A switched reluctance motor includes a stator having a plurality of pairs of opposing stator pole portions which project inward in the diametrical direction and which extend in the axial direction, a rotor rotatably disposed in the stator and having a plurality of rotor pole portions which project outward in the diametrical direction and which extend in the axial direction and axis portion which is rotatably supported on a housing. A plurality of coils are wound on each of the pair of the stator pole portions and an absorbing mechanism is provided for absorbing radial vibrations of the rotor which are generated by a variation of the magnetic attracting force acting on the rotor pole portions.

7 Claims, 5 Drawing Sheets

SWITCHED RELUCTANCE MOTOR

BACKGROUND OF THE INVENTION

1. Field of the Invention

The present invention is directed to a switched reluctance motor and more specifically, to a switched reluctance motor having a rotor with vibration absorbing means.

2. Description of the Prior Art

A conventional switched reluctance motor is disclosed in, for example, GB 2 231 214A. This switched reluctance motor includes a housing, a stator fixed in an inner bore of the housing and formed by laminating electromagnetic steel plates and a rotor disposed in the stator and formed by laminating electromagnetic steel plates. The rotor is fixed to an output shaft which is rotatably supported on side portions of the housing through bearings and thereby is rotatably disposed in the stator. The rotor has a plurality of pairs of rotor pole portions which project outward in the diametrical direction and which extend in the axial direction. The stator has a plurality of pairs of opposing stator pole portions which project inward in the diametrical direction and which extend in the axial direction. Each of the stator pole portions is opposed to each of the rotor pole portions in response to the rotation of the rotor and a certain clearance is maintained between the stator pole portions and the rotor pole portions which are opposed to each other. A coil is wound on each of the stator pole portions. The coils, which are wound on each of the pairs of opposing stator pole portions, are connected in series with each other whereby a magnetic flux is generated between each pair of stator pole portions when current is supplied to the coils which are wound thereon. A magnetic attracting force results between the rotor pole portions and the stator pole portions which are approaching each other. This magnetic attracting force is changed by controlling supply current by means of switching elements in response to the rotational position of the rotor whereby rotary torque is produced.

The current which is supplied to the coil wound on one pair or several pairs of stator pole portions being approached by one pair or several pairs of rotor pole portions is switched on and off such as a pulse. In general, the current is switched on when a pair of rotor pole portions begins to be aligned with a pair of stator pole portions, and the current is switched off before a pair of rotor pole portions is aligned with a pair of stator pole portions. Thus, the magnetic attracting force increases proportionally while the current is supplied, and disappears in a moment when the current is switched off. On one hand, rotary torque is obtained by this magnetic attracting force. On the other hand, a pair or several pairs of stator pole portions are attracted radially to a pair of rotor pole portions by this magnetic attracting force, respectively, so that a load is radially applied to the rotor.

The bearings, which support the rotor on the side portions of the housing, normally allow a certain relative movement or play in the radial direction. Furthermore, due to a measuring error in making the stator and the rotor, the magnetic attracting force generated between the rotor pole portions and the stator pole portions which are approaching each other is unsymmetrical. As a result, the rotor is attracted radially to the stator pole portion which generates a large magnetic attracting force. When the magnetic attracting force disappears, this radial load acting on the rotor disappears suddenly and simultaneously the bearings supporting the rotor receive an impulse. This impulse to the bearings is generated periodically in response to the rotation of the rotor whereby vibration of the side portions of the housing generates objectionable acoustic noise.

SUMMARY OF THE INVENTION

It is therefore an object of the present invention to provide an improved switched reluctance motor which overcomes the above drawback.

It is another object of the present invention to provide an improved switched reluctance motor which can reduce the objectionable acoustic noise.

The improved switched reluctance motor includes a stator having a plurality of pairs of opposing stator pole portions which project inwardly in the diametrical direction and which extend in the axial direction. A rotor is disposed in the stator and is provided with a plurality of projecting rotor pole portions which project outwardly in the diametrical direction and which extend in the axial direction. The rotor also has an axis portion which is rotatably supported on a housing, or more specifically, on a shaft which is rotatably supported at opposite ends in the housing by means of bearings. A plurality of coils are wound on each of the pairs of stator pole portions and are connected to a suitable drive circuit. In order to absorb radial vibrations of the rotor generated by the variation of the magnetic attracting force acting on the rotor pole portions, a plurality of axially directed holes are formed in the axis portion of the rotor.

BRIEF DESCRIPTION OF THE DRAWINGS

Additional objects and advantages of the present invention will become more apparent from the following detailed description of preferred embodiments thereof when considered with reference to the attached drawings, in which.

DETAILED DESCRIPTION OF THE PREFERRED EMBODIMENTS

A switched reluctance motor constituted in accordance with the preferred embodiments of the present invention will be described with reference to the attached drawings.

Figure 1:
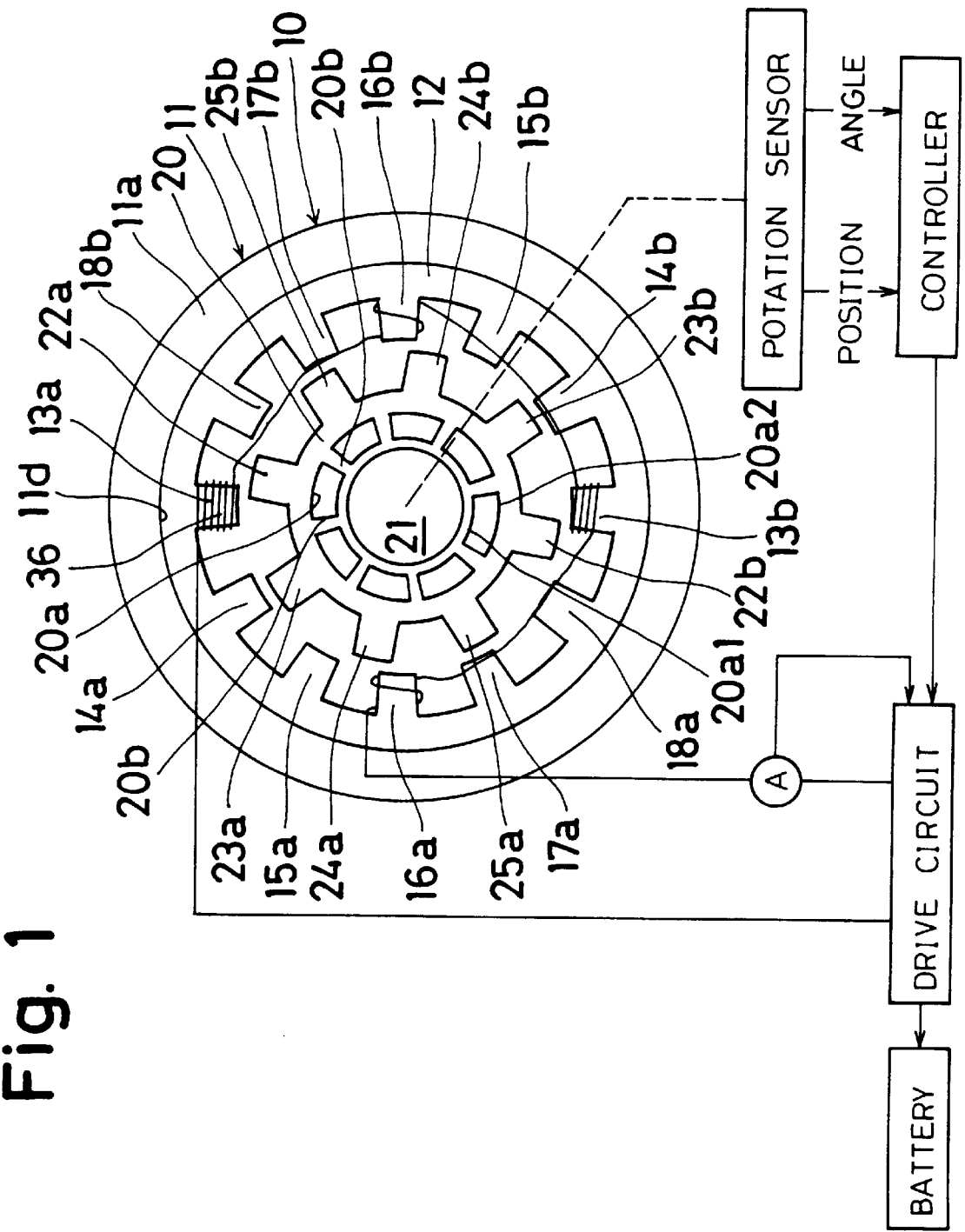
FIG. 1 is a schematic view of a first embodiment of a switched reluctance motor in accordance with the present invention.
Figure 2:
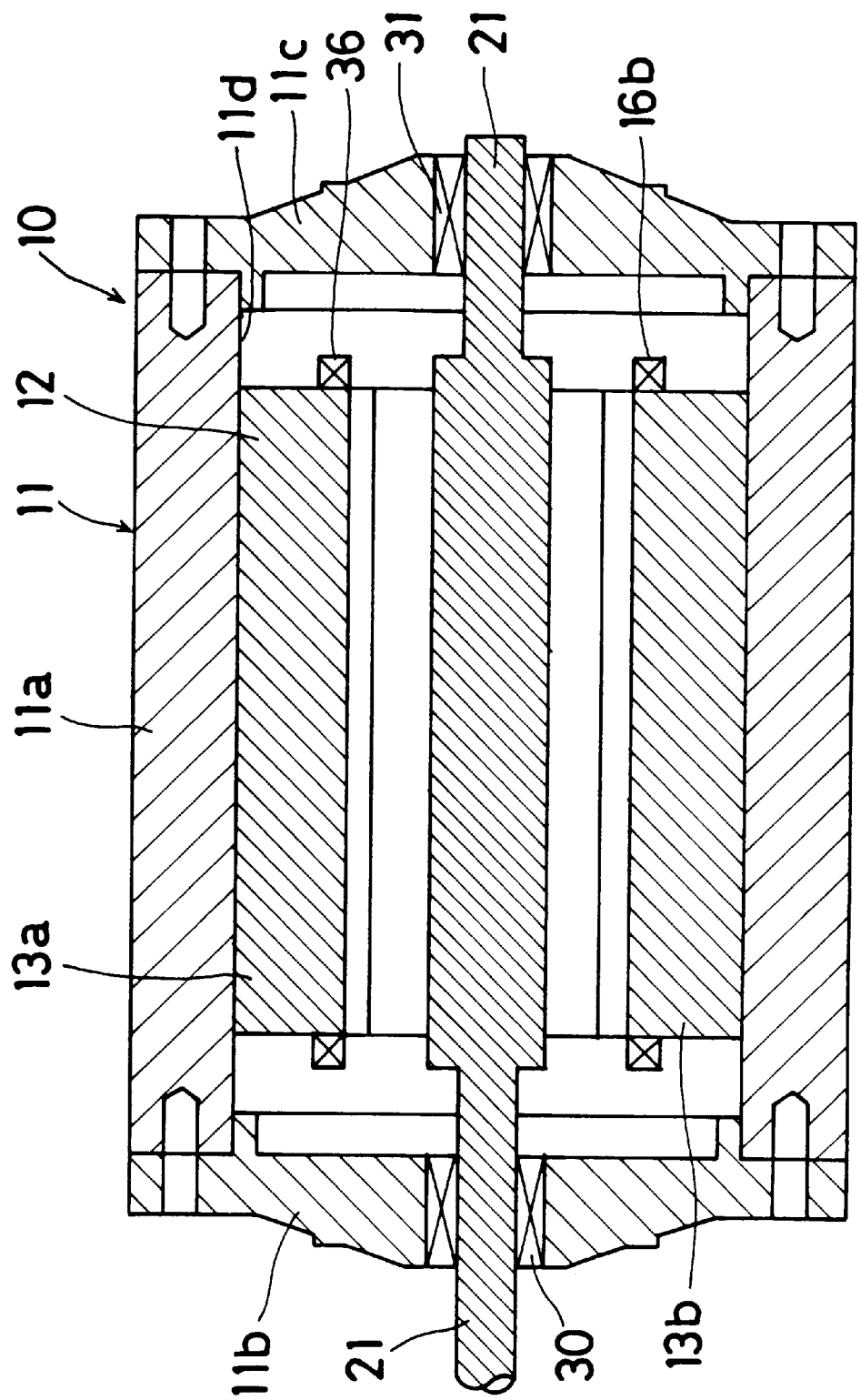
FIG. 2 is a longitudinal sectional view of the first embodiment of a switched reluctance motor in accordance with the present invention.

Referring to FIGS. 1 and 2, a switched reluctance motor 10 is provided with a cylindrical housing 11 which is made of aluminum. The housing 11 is composed of a cylindrical portion 11a and side housings 11b, 11c which are fixed to ends of the cylindrical portion 11a. In an inner bore 11d of the cylindrical portion 11a, a cylindrical stator 12 is mounted. The stator 12 is formed by laminating electromagnetic steel plates and is fixed to the inner bore 11d of the housing 11 at its outer circumferential portion by heat shrinking.

The stator 12 is provided with six pairs of opposing stator pole portions 13a, 13b; 14a, 14b; 15a, 15b; 16a, 16b; 17a, 17b; 18a, 18b which project inward in the diametrical direction at regular intervals and which extend in the axial direction, respectively. On each pair of stator pole portions, for example, on two pairs of stator pole portions 13a, 13b; 16a, 16b, coils 36 are wound thereon, respectively and are connected in series with each other. Coils (not shown) are wound on each of two pairs of stator pole portions 14a, 14b; 17a, 17b and 15a, 15b; 18a, 18b and are connected in pairs in series. These coils are connected with a drive circuit 28.

A rotor 20, which is formed by laminating electromagnetic steel plates, is provided with a central hole at its axial center. An output shaft 21, which is rotatably supported on the side housings 11b, 11c at both ends through bearings 30, 31 and which corresponds to an axis portion of the rotor 20 in the present invention, is fixedly fitted into the central hole of the rotor 20. Thus, the rotor 20 is able to rotate with the output shaft 21 within the body of the stator 12. Furthermore, the rotor 20 is provided with four pairs of opposing rotor pole portions 22a, 22b; 23a, 23b; 24a, 24b; 25a, 25b which project outward in the diametrical direction, at regular intervals and which extend in the axial direction, respectively. As shown in FIG. 1, each of these rotor pole portions 22a, 22b; 23a, 23b; 24a, 24b; 25a, 25b is able to be opposed to each of the stator pole portions 13a, 13b; 14a, 14b; 15a, 15b; 16a, 16b; 17a, 17b; 18a, 18b while maintaining a certain clearance therebetween in response to the rotation of the rotor 20.

In this first embodiment, as shown in FIG. 1, axial through holes 20a, each of which extends in the axial direction, are formed in the rotor 20 between each of the rotor pole portions 22a, 22b; 23a, 23b; 24a, 24b; 25a, 25b and the output shaft 21, respectively. Each of the axial holes 20a has an inner circumferential portion 20a1 and an outer circumferential portion 20a2 which are located on coaxial circles about the axial center of the output shaft 21, respectively. The adjacent axial holes 20a are separated from each other in the circumferential direction by a rib portion 20b which is located between the adjacent rotor pole portions in the circumferential direction and which extends in the radial direction, respectively. Each of the axial holes 20a is aligned with each of the rotor pole portions 22a, 22b; 23a, 23b; 24a, 24b; 25a, 25b in the radial direction and a circumferential width of each of the axial holes 20a is the same as that of each of the rotor pole portions or is larger than each of the rotor pole portions. The axial holes 20a and the rib portions 20b constitute the absorbing means of the present invention.

A well known rotation sensor 26, e.g., such as an encoder or a resolver or the like, is disposed on the end of the output shaft 21 in order to detect the rotation position of the rotor 20. The rotation sensor 26 is electrically connected to a controller 27 and therefore, a position signal and an angle signal detected by the rotation sensor 26 is transmitted to the controller 27.

The controller 27 is electrically connected to the drive circuit 28 to which the coils wound on each of the stator pole portions 13a, 13b; 14a, 14b; 15a, 15b; 16a, 16b; 17a, 17b; 18a, 18b are connected and transmits an output signal to the drive circuit 28 in response to a position signal and an angle signal of the rotation sensor 26. The drive circuit 28 is composed of an inverter using switching elements, such as transistors or thyristors and supplies current such as a pulse to each of the coils in response to the output signal of the controller 27.

The above-described first embodiment of the switched reluctance motor 10 operates in the following manner. When it is detected by the rotation sensor 26, the rotor 20 is in a predetermined position in which two of four pairs of rotor pole portions 22a, 22b; 23a, 23b; 24a, 24b; 25a, 25b begin to be aligned with two of six pairs of stator pole portions 13a, 13b; 14a, 14b; 15a, 15b, 16a, 16b; 17a, 17b, 18a, 18b, respectively, the controller 27 transmits an output signal responding to the detected signal of the rotation sensor 26 to the drive circuit 28. The drive circuit 28 supplies current to the coils which are wound on two pairs of stator pole portions beginning to be aligned with the two pairs of rotor pole portions in response to the output signal of the controller 27. The stator pole portions on which these coils are wound are magnetized and a magnetic flux is generated between the magnetized stator pole portions through the rotor pole portions located between the magnetized stator pole portions. A magnetic attracting force results between the rotor pole portions and the stator pole portions which are beginning to be aligned with each other and a rotary torque acts on the rotor 20 as a result of a component force of the magnetic attracting force to rotate the rotor pole portions toward alignment with the stator pole portions.

Figure 3:
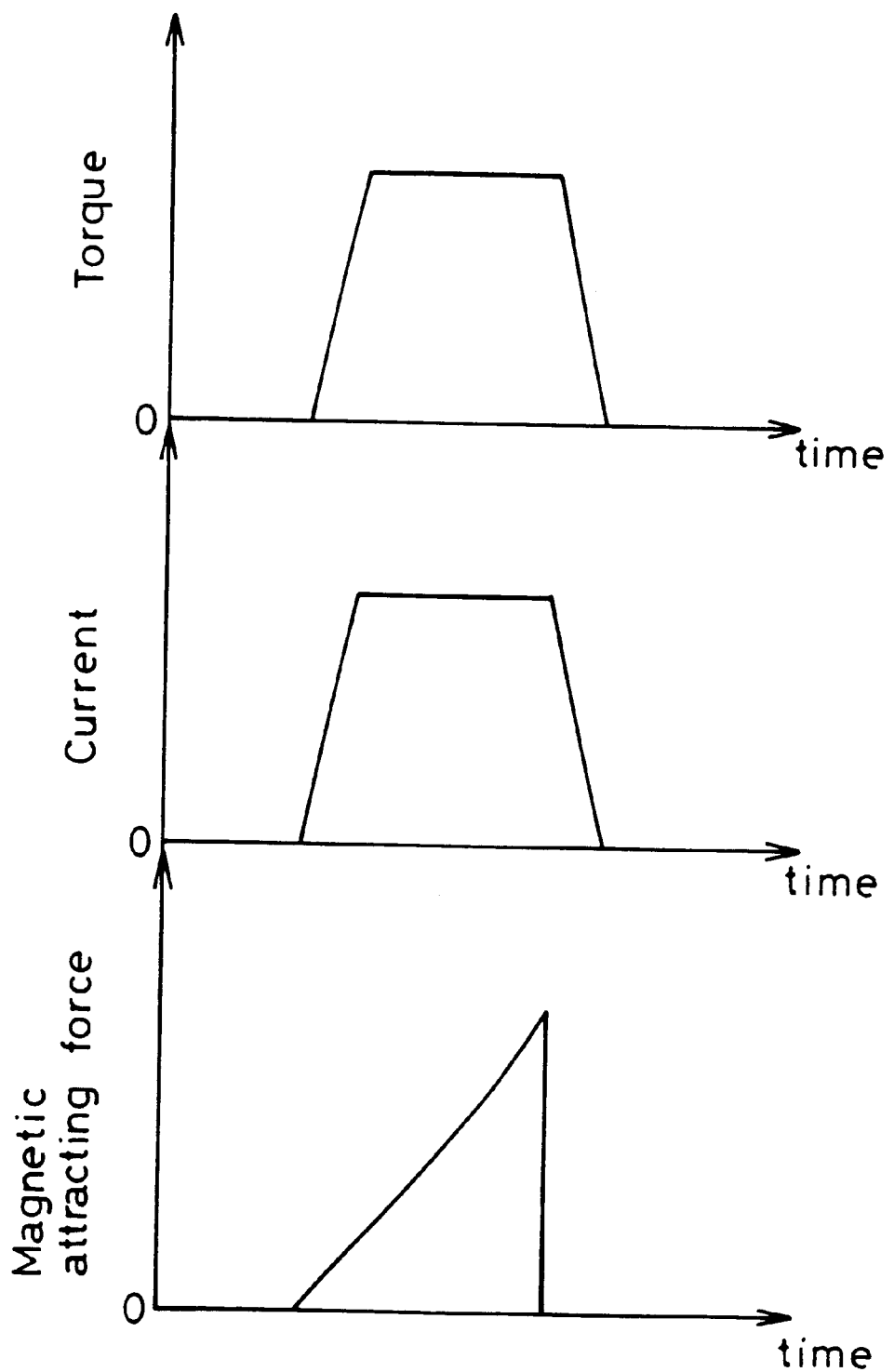
FIG. 3 illustrates graphs which show variations of torque, current and magnetic attracting force upon the supply of current to a coil of the first embodiment of a switched reluctance motor in accordance with the present invention.

When the rotor 20 is rotated by the torque and it is detected by the rotation sensor 26 that the rotor 20 is in a predetermined position in which two pairs of rotor pole portions are just before an aligned position with regard to two pairs of magnetized stator pole portions, respectively, that is to say, it is detected by the rotation sensor 26 that the rotor 20 is in a final effective position in which the above component force acts on the rotor 20, the drive circuit 28 stops supplying the current to the coils wound on the magnetized stator pole portions in response to the output signal of the controller 27 which is made in response to this detected signal of the rotation sensor 26. As mentioned above, the current which is supplied to the coils wound on two pairs of the stator pole portions opposing two pairs of rotor pole portions is switched on and off such as a pulse and a certain rotary torque is obtained by the action of the above magnetic attracting force. FIG. 3 shows variations of the torque, the current and the magnetic attracting force upon the supply of current to the coils which are wound on two pairs of stator pole portions. Now, the above on-off timing of the supply of the current is determined in response to the demand of the rotational speed or the torque of the switched reluctance motor.

On the other hand, two pairs of magnetized stator pole portions which are opposed to two pairs of rotor pole portions, are attracted to the opposing rotor pole portions by the above magnetic attracting force, respectively. Thus, a load is radially imparted to the rotor 20 and the output shaft 21 and the rotor 20 is attracted to the stator 12. For example, in FIG. 1, the stator pole portions 13a, 13b; 16a, 16b opposed to the rotor pole portions 22a, 22b; 24a, 24b are magnetized by the supply of the current to the coil 36 and are attracted to the rotor pole portions 22a, 22b; 24a, 24b, respectively. The rotor 20 and the output shaft 21 are attracted in the radial direction. When the magnetic attracting force disappears upon switching off the current, this radial load disappears suddenly and simultaneously the rotor 20 and the output shaft 21 are released from the radial load. As a result, the output shaft 21 and the bearings 30, 31 supporting the rotor 20 on the side housings 11b, 11c receive an impulse and this impulse transmits to the said housings 11b, 11c. This impulse is generated periodically by the magnetization of two of six pairs of stator pole portions 13a, 13b; 14a, 14b; 15a, 15b; 16a, 16b; 17a, 17b; 18a, 18b and the side housings 11b, 11c of the housing 11 vibrate.

In this embodiment, the vibrations are effectively prevented by the axial holes 20a and the rib portions 20b which constitute the absorbing means for absorbing the impulses caused by the magnetic attracting force which is applied to the rotor 20. Since the rigidity of each of the rotor pole portions 22a, 22b; 23a, 23b; 24a, 24b; 25a, 25b in the radial direction is reduced by each of the axial holes 20a, each of the rotor pole portions 22a, 22b; 23a, 23b; 24a, 24b; 25a, 25b is attracted to each of the opposing stator pole portions 13a, 13b 14a, 14b; 15a, 15b; 16a, 16b; 17a, 17b; 18a, 18b while each of the axial holes 20a is deformed. Thus, the radial load acting on the output shaft 21 and the bearings 30, 31 due to the magnetic attracting force acting on the rotor 20 is relieved. When the magnetic attracting force disappears, the reaction is absorbed by the return of the deformation of each of the axial holes 20a, thereby preventing the above mentioned impulses from being transmitted to the output shaft 21 and the bearings 30, 31. Accordingly, the vibrations of the side housings 11b, 11c due to the impulses acting on the output shaft 21 are decreased and the generation of the objectionable acoustic noise due to the vibrations of the side housings 11b, 11c is decreased. Furthermore, since the radiation area of the rotor 20 is increased by the axial holes 20a, the performance for radiating heat is improved. Furthermore, the weight of the switched reluctance motor is reduced by the axial holes 20a.

Figure 4:
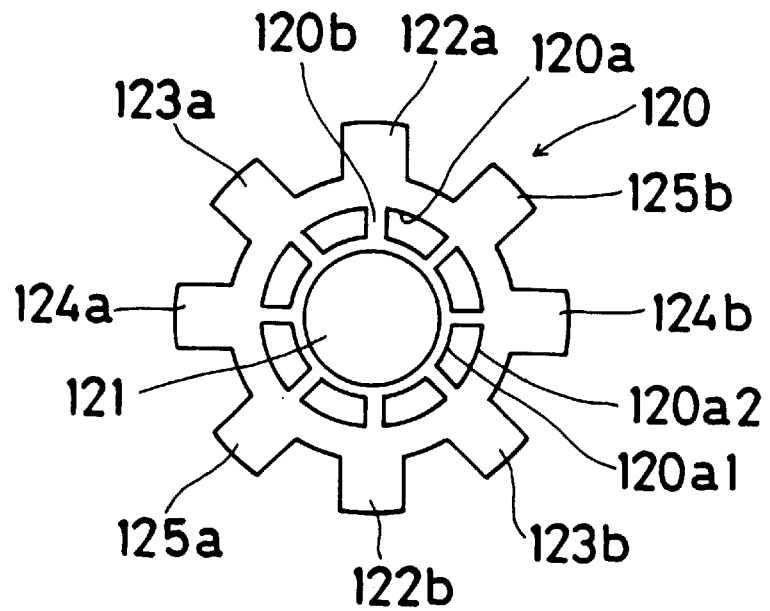
FIG. 4 is a sectional view of a second embodiment of a rotor of a switched reluctance motor in accordance with the present invention.

FIG. 4 shows a rotor 120 of a second embodiment in accordance with the present invention. In this second embodiment, axial holes 120a, each of which extends in the axial direction, are formed in the rotor 120 between each of the adjacent rotor pole portions 122a, 122b; 123a, 123b; 124a, 124b; 125a, 125b in the circumferential direction, respectively. Each of the axial through holes 120a has an inner circumferential portion 120a1 and an outer circumferential portion 120a2 which are located on coaxial circles about the axial center of the output shaft 121, respectively. The adjacent axial holes 20a are separated from each other in the circumferential direction by a rib portion 120b which extends radially from the axial center of the output shaft 121 to each of the rotor pole portions 122a, 122b; 123a, 123b; 124a, 124b; 125a, 125b and which is aligned with each of the rotor pole portions 122a, 122b; 123a, 123b; 124a, 124b; 125a, 125b in the radial direction, respectively. In FIG. 4, the same parts as compared with FIG. 1 are identified by reference numerals to which 100 has been added. Now, the axial holes 120a and the rib portions 120b constitute the absorbing means of the present invention.

According to the second embodiment, as in the above mentioned first embodiment, the vibrations are effectively prevented since the impulses due to the magnetic attracting force acted on the rotor pole portions and transmitted to the output shaft 121 are absorbed by the absorbing means (the axial holes 120a and the rib portions 120b). Since the rigidity of each of the rotor pole portions 122a, 122b; 123a, 123b; 124a, 124b; 125a, 125b in the radial direction is reduced by each of the axial holes 120a, each of the rotor pole portions 122a, 122b; 123a, 123b; 124a, 124b; 125a, 125b is attracted to each of the opposing stator pole portions while each of the axial holes 120a and each of the rib portions 120b are deformed. Thus, the radial load imparted to the output shaft 121 and the bearings (the magnetic attracting force acting on the rotor 120) is relieved. When the magnetic attracting force disappears, since the reaction is absorbed by the return of the deformation of each of the axial holes 120a and each of the rib portions 120b, the transmission of the above mentioned impulses to the output shaft 121 and the bearing is effectively prevented. Accordingly, it is possible to obtain the same effects as the above first embodiment. Since the other structures are the same as the first embodiment, the description is omitted.

Figure 5:
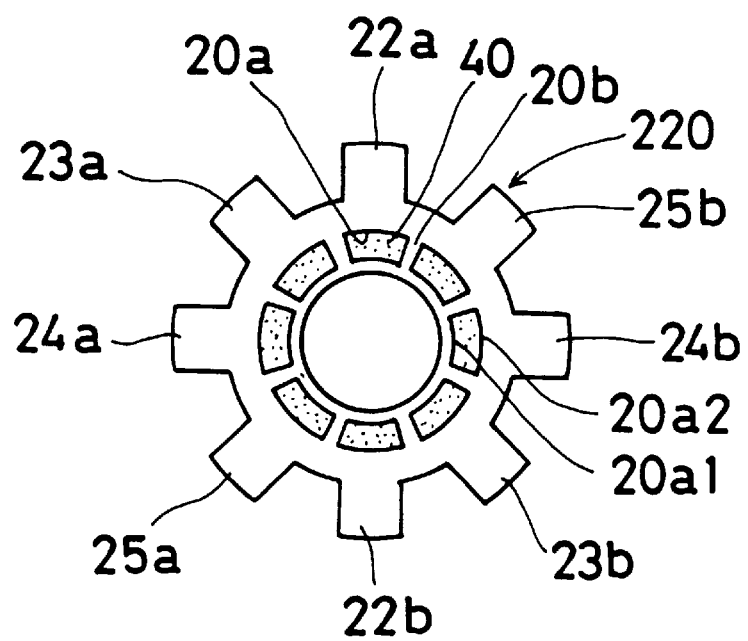
FIG. 5 is a sectional view of a third embodiment of a rotor of a switched reluctance motor in accordance with the present invention.

FIG. 5 shows a rotor 220 of a third embodiment in accordance with the present invention. In FIG. 5, the same parts as compared with FIG. 1 are identified by the same referenced numerals. Referring to FIG. 5, a vibration absorbing material 40 such as rubber, resin, glass wool or the like, is filled in each of the axial through holes 20a. This vibration absorbing material 40 constitutes part of the absorbing means of the present invention. In this third embodiment, as the above first embodiment, vibrations are effectively relieved since the impulses due to the magnetic attracting force acting on the rotor pole portions are not transmitted to the output shaft 21 and the bearings due to the axial holes 20a. Furthermore, according to the third embodiment, impulses are further absorbed by the vibration absorbing material 40. Accordingly, it is possible to further decrease the amount of the vibrations or the impulses which are transmitted to the output shaft 21 and therefore, the anti-noise effect is further improved as compared with the above first embodiment. Since the other structures and effect are the same as the first embodiment, the description is omitted.

Figure 6:
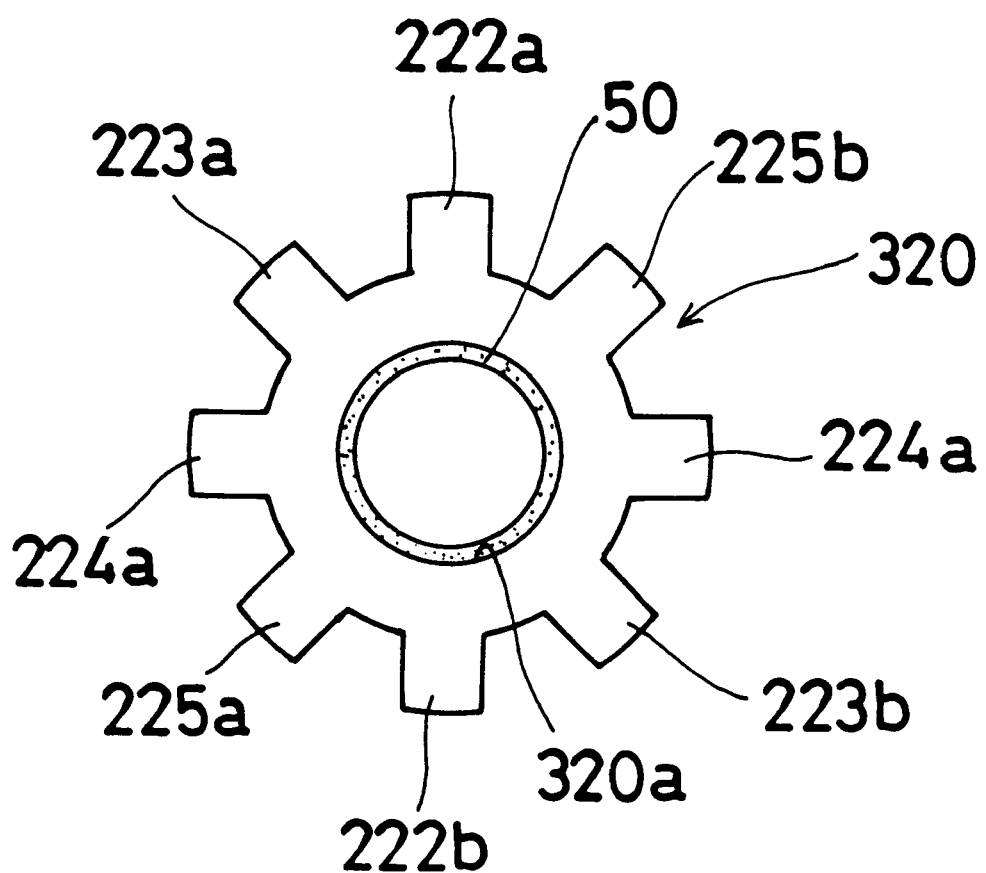
FIG. 6 is a sectional view of a fourth embodiment of a rotor of a switched reluctance motor in accordance with the present invention.

FIG. 6 shows a rotor 320 of a fourth embodiment in accordance with the present invention. In FIG. 6, the same parts as compared with FIG. 1 are identified by reference numerals to which 200 has been added. Referring to FIG. 6, the rotor 320 is provided with a large central hole at its axial center. An output shaft 221 is loosely fitted into the large central hole of the rotor 320. A vibration absorbing material 50, made of resin or the like is fitted into an annular space 320a which is formed between the output shaft 221 and an inner circumference of the central hole of the rotor 320. The vibration absorbing material 50 constitutes the absorbing means of the present invention. In this fourth embodiment, vibrations are effectively prevented since the impulses due to the magnetic attracting force acting on the rotor pole portions are not transmitted to the output shaft 221 and the bearings by the vibration absorbing material 50. Namely, since the rigidity of each of the rotor pole portions 222a, 222b; 223a, 223b; 224a, 224b; 225a, 225b in the radial direction is reduced by the vibration absorbing material 50, each of the rotor pole portions is attracted to each of the opposing stator pole portions while the vibration absorbing material 50 and the circular space 320a are deformed. Thus, the radial load acting on the output shaft 221 and the bearings (the magnetic attracting force acting on the rotor 320) is relieved. When the magnetic attracting force disappears, since the reaction is absorbed by the return of the deformation of the vibration absorbing material 50 and the circular space 320a, the transmission of the abovementioned impulses to the output shaft 221 and the bearings is effectively prevented. Since the other structures are the same as the first embodiment, the description is omitted.

In each of the four embodiments, since the rigidity of each of the rotor pole portions in the radial direction is reduced, the amplitude of the rotor pole portions increases and therefore, noise which is propagated from the rotor through air, increases. However, since the rotor is surrounded by the stator and the side housings, noise which is generated outside the housing does not increase. Furthermore, in the above mentioned four embodiments, the present invention is applied to a switched reluctance motor which includes a stator having six pairs of stator pole portions and a rotor having four rotor pole portions. However, it is possible to apply the present invention to other types of switched reluctance motors, for example, a switched reluctance motor which includes a stator having three pairs of stator pole portions and a rotor having two pairs of rotor pole portions. Furthermore, in the above mentioned four embodiments, the present invention is applied to a switched reluctance motor which includes a housing having a cylindrical portion. However, the present invention is independent of the presence of the cylindrical portion and it is possible to apply the present invention to other types of switched reluctance motors, for example, a switched reluctance motor in which plural bolts pass through the stator with opposite ends of the bolts being fixed to side housings so that the stator is directly secured to the side housings.

As mentioned above, according to the present invention, since the vibrations due to the variation of the magnetic attracting force acting on the rotor pole portions is absorbed by absorbing means, the vibrations transmitted to the axis portion are reduced. Accordingly, it is possible to reduce the objectionable acoustic noise caused by the vibration of the axis portion.

The principles, preferred embodiments and modes of operation of the present invention have been described in the foregoing description. The invention which is intended to be protected herein should not, however, be construed as limited to the particular forms disclosed, as these are to be regarded as illustrative, rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. A switched reluctance motor comprising:
    a stator having a plurality of pairs of opposing stator pole portions which project inward in the diametrical direction and which extend in the axial direction;
    a rotor rotatably disposed in the stator and having a plurality of rotor pole portions which project outward in the diametrical direction and which extend in the axial direction and an axis portion which is rotatably supported on a housing;
    a plurality of coils wound on each of the pairs of the stator pole portions, and
    absorbing means provided in the rotor and placed between each of the rotor pole portions and the axis portion in the diametrical direction to reduce the magnitude of the diametrical force transmitted from each of the rotor pole portions to the axis portion and for absorbing radial vibrations of the rotor generated by a variation of a magnetic attracting force acting on the rotor pole portions,
    wherein the absorbing means includes axial holes which are formed in the rotor between each of the rotor pole portions and the axis portion and which extend in the axial direction, respectively, and rib portions which are formed on the rotor to separate adjacent axial holes from each other in the circumferential direction, respectively.

2. A switched reluctance motor as recited in claim 1, wherein each of the axial holes is aligned with each of the rotor pole portions in the radial direction and each of the rib portions is located between the adjacent rotor pole portions in the circumferential direction.

3. A switched reluctance motor as recited in claim 2, wherein each of the axial holes is filled with a vibration absorbing material.

4. A switched reluctance motor comprising:
    a stator having a plurality of pairs of opposing stator pole portions which project inward in the diametrical direction and which extend in the axial direction;
    a rotor rotatably disposed in the stator and having a plurality of rotor pole portions which project outward in the diametrical direction and which extend in the axial direction and an axis portion which is rotatably supported on a housing;
    a plurality of coils wound on each of the pairs of the stator pole portions, and
    absorbing means provided in the rotor and placed between each of the rotor pole portions and the axis portion in the diametrical direction to reduce the magnitude of the diametrical force transmitted from each of the rotor pole portions to the axis portion and for absorbing radial vibrations of the rotor generated by a variation of a magnetic attracting force acting on the rotor pole portions,
    wherein the absorbing means includes axial holes which are formed on the rotor between each of the adjacent rotor pole portions in the circumferential direction and which extend in the axial direction, respectively, and rib portions which are formed on the rotor to separate adjacent axial holes from each other in the circumferential direction, respectively.

5. A switched reluctance motor as recited in claim 4, wherein each of the rib portions extends radially from the axis portion to each of the rotor pole portions so as to be aligned with each of the rotor pole portions in the radial direction.

6. A switched reluctance motor as recited in claim 5, wherein each of the axial holes is filled with a vibration absorbing material.

7. A switched reluctance motor comprising:
    a stator having a plurality of pairs of opposing stator pole portions which project inward in the diametrical direction and which extend in the axial direction;
    a rotor rotatably disposed in the stator and having a plurality of rotor pole portions which project outward in the diametrical direction and which extend in the axial direction and an axis portion which is rotatably supported on a housing;
    a plurality of coils wound on each of the pairs of the stator pole portions, and
    absorbing means provided in the rotor and placed between each of the rotor pole portions and the axis portion in the diametrical direction to reduce the magnitude of the diametrical force transmitted from each of the rotor pole portions to the axis portion and for absorbing radial vibrations of the rotor generated by a variation of a magnetic attracting force acting on the rotor pole portions,
    wherein the absorbing means is comprised of an annular space which is formed between the rotor pole portions and the axis portion so as to accommodate the axis portion therein and which extends in the axial direction and a vibration absorbing material filling said annular space.

* * * * *